United States Patent [19]

Stricker

[11] Patent Number: 4,741,411
[45] Date of Patent: May 3, 1988

[54] MUFFLER SYSTEM

[75] Inventor: David K. Stricker, Juneau, Wis.

[73] Assignee: Deere & Company, Moline, Ill.

[21] Appl. No.: 3,103

[22] Filed: Jan. 14, 1987

[51] Int. Cl.⁴ .............................. F01N 1/14; F01P 1/6
[52] U.S. Cl. .................................. 181/283; 181/240; 181/255; 181/262
[58] Field of Search ............... 181/204, 238, 240, 241, 181/243, 259, 262, 263, 283, 255

[56] References Cited

U.S. PATENT DOCUMENTS

| | | | |
|---|---|---|---|
| 3,795,287 | 3/1974 | Rose | 181/283 |
| 3,796,277 | 3/1974 | Gordon | 181/204 X |
| 4,265,332 | 5/1981 | Presnall et al. | 181/283 X |
| 4,471,853 | 9/1984 | Callaghan et al. | 181/262 X |
| 4,478,310 | 10/1984 | Harten | 181/243 X |
| 4,487,289 | 12/1984 | Kicinski et al. | 181/283 X |

Primary Examiner—B. R. Fuller

[57] ABSTRACT

An improved muffler system for mounting within a restricted engine compartment such as the engine compartment of a small off-road vehicle including a muffler surrounded by a heat shield having a plurality of apertures formed therein for selectively cooling selected certain areas of the engine compartment in conjunction with a venturi which creates a flow of cooling air from outside the engine compartment, over the engine, into the apertures, between the heat shield and the muffler to a point where the exhaust gas and the initially cooler air are mixed and subsequently exited into the atmosphere.

13 Claims, 6 Drawing Sheets

MUFFLER SYSTEM

BACKGROUND OF THE INVENTION

This invention relates to an improved muffler system and more particularly pertains to an improved muffler system that can be mounted inside a restricted engine compartment such as the engine compartment of a small off-road vehicle.

In small off-road vehicles such as lawn tractors and riding mowers, it is important from both an aesthetic and a safety aspect that any muffler system associated therewith be mounted, as much as possible, inside the engine compartment.

Concerning safety, if the muffler system were externally mounted as shown in U.S. Pat. No. 3,796,277 to Gordon, it could accidentally be contacted by the vehicle operator or others thereby possibly causing them injury. In order to prevent injury from an externally mounted hot muffler as disclosed in U.S. Pat. No. 4,487,289 to Kicinski et al, it is known to provide a heat shield for insulating the muffler and to at least partially enclose both the muffler and heat shield inside the engine compartment.

However, by enclosing the muffler system inside the engine compartment proximate the engine, unacceptable heat radiation problems were initially encountered. For instance, if the muffler were located immediately adjacent a portion of the engine compartment shroud, heat radiating from the muffler system heated that portion of the shroud adjacent thereto to an unacceptable level such that another potential safety hazard was created thereby to the operator and others. Additionally, it was found that, due to the configuration of small vehicle engine compartments, heat radiated from the muffler system mounted in near proximity to the carburetor caused further problems by overheating the fuel in the carburetor causing fuel vapor lock.

Previous attempts to position a muffler system within the engine housing of a vehicle, such as a garden tractor, as disclosed in U.S. Pat. No. 4,265,332 to Presnall et al, were directed toward having the muffler surrounded by an open ended tubular heat shield having a venturi tube at its outer end which received and accelerated the exhaust gases to create a flow of cooling air through the engine housing and between the muffler and the tubular heat shield for extracting heat from both the engine housing and muffler. While the Presnall et al design did create a flow of cooler air through the engine housing, only one end of the muffler, the point where the air entered the space between the muffler and the heat shield, was relatively cooler while the remainder of the muffler system surface continued to radiate heat at an unacceptable level into the engine compartment.

Thus, there is a need for a muffler system which can be mounted in the limited space of a small off-road vehicle engine compartment which provides for the outer surfaces of the muffler system immediately proximate critical components within the engine compartment to be relatively cooler while the balance of the outer surfaces proximate non-critical components are allowed to become relatively hotter and which radiate the heat from the outer surface in controlled directions away from the critical components.

SUMMARY OF THE INVENTION

The present invention is an improved muffler system comprising a muffler and a protective heat shield having a plurality of apertures selectively formed therein such that selected areas of the outer surface of the muffler system heat shield radiates relatively less heat than do other areas of the heat shield.

In accordance with the present invention, the improved muffler system includes a muffler having an inlet and an outlet, a heat shield, having a plurality of apertures formed therein surrounding the muffler and brackets for mounting the muffler system inside the limited space of an engine compartment such as that of a small off-road vehicle. The heat shield has an elongated portion extending therefrom. The outlet of the muffler extends into the elongated portion of the heat shield and forms a venturi for pulling air into the muffler system via the apertures. Cooler air for cooling the muffler is pulled into the space between the muffler and the heat shield via the apertures by the venturi. This initially cooler air is pulled between the heat shield and the muffler and out through the exhaust pipe formed by the position of the muffler outlet in the elongated portion of the heat shield. The venturi principle utilized is disclosed in U.S. Pat. No 4,265,332 which is hereby incorporated by reference.

One important feature of the present invention is the selection of the location and size of the apertures. The position and size of the plurality of apertures is selected to provide relatively cooler areas on specific outer surfaces of the heat shield. The position and size of these apertures is selected such that specific outer surfaces of the heat shield proximate certain critical areas in the engine compartment radiate significantly less heat into the critical areas of the engine compartment and/or toward the engine compartment shroud. This relative cooling effect on critical components in the engine compartment is accomplished while both optimizing the venturi effect established by the relationship of the muffler outlet in the elongated portion of the surrounding heat shield and pulling cooler air over the engine from outside into the engine compartment.

The primary object of this invention, therefore, is to provide an improved muffler system which selectively cools the outer surface of the muffler, thereby reducing the heat radiated from selected areas of the outer surface of the heat shield into the engine compartment and which provides for optimization of both the selected cooling and the venturi effect so that cool air is drawn into the engine compartment over the various components before entering the space between the muffler and the heat shield; which allows the muffler system to be mounted inside the limited space of an off-road vehicle engine compartment such that the engine compartment shroud is not overheated; which allows the muffler system to be mounted in the engine compartment so that vapor locks do not occur; which presents the engine crank case from overheating.

Other objects and advantages of the invention will be apparent from the following description, accompanying drawings and the appended claims.

DESCRIPTION OF THE PREFERRED EMBODIMENTS

Figure 1:
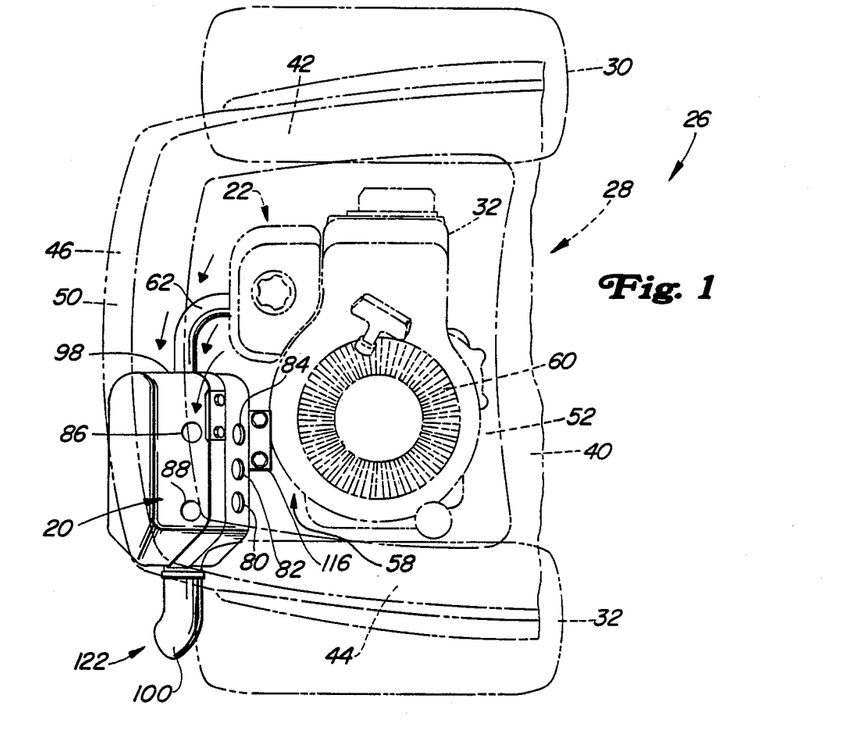
FIG. 1 is a partial top view of the muffler system of the present invention mounted in a 9.0 hp rear engine riding mower.
Figure 6:
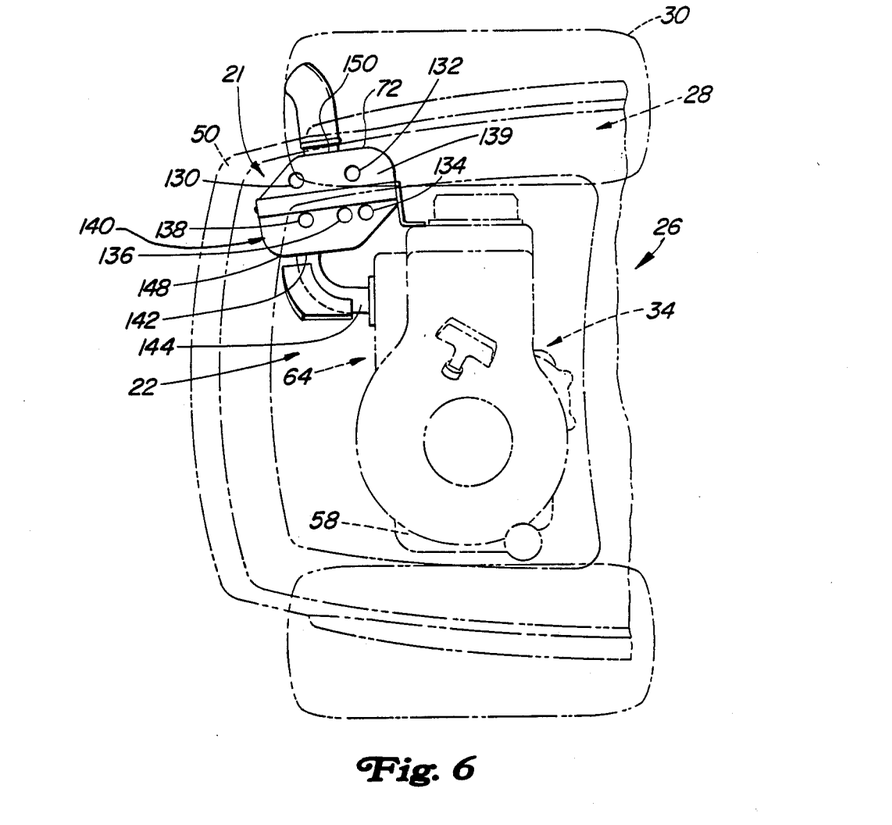
FIG. 6 is a partial view of the muffler system of the present invention mounted in 12.5 hp rear engine riding mower engine compartment.

The muffler systems 20, 21 of the present invention is illustrated in FIGS. 1 and 6 as being disposed in the engine compartment 22 of a small off-road vehicle such as a riding mower 26. The riding mower 26 is of a basic standard construction and includes a chassis 28 mounted on a pair of conventional drive wheels 30, 31 and a pair of steerable wheels (not shown) controlled by a steering wheel (not shown). An engine 32, 34 is operatively mounted to the chassis 28 and is connected to the drive wheels 30, 31 by a transaxle 34 which is disclosed in U.S. patent application Ser. No. 944,089 filed on Dec. 22, 1986 which is hereby incorporated by reference.

Figure 2:
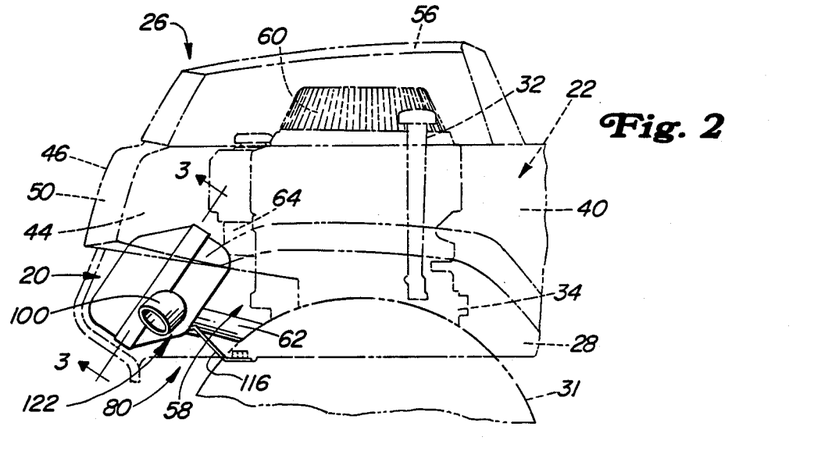
FIG. 2 is a partial side view of the muffler system of FIG. 1.

Specifically, for the purposes of illustrating the present invention, a 9 hp engine 32, as illustrated in FIGS. 1 and 2, and a 12.5 hp engine 34, as illustrated in FIG. 6 and a muffler system 20, 21, respectively, are positioned within the same engine compartment 22.

As shown in FIGS. 1, 2 and 6, the engine compartment 22 is of standard design and includes a front wall 40, two sidewalls 42, 44 and a rear wall 46. The walls 40, 42, 44, 46 combine to form what is commonly referred to as a shroud 50. The top 52 and bottom 54 of the engine compartment 22 are normally open, but an optional engine cover 56 may be utilized to enclose the normally open, top portion 48.

In the muffler systems 20, 21 developed for the specific engines 32, 34 and engine compartment 22 illustrated, the problem was to accommodate a muffler system into the engine compartment 22 along with the two particular engine models utilized while maximizing the performance of both the muffler system and each engine 32, 34 within that given engine compartment 22 space.

Specifically, as shown in FIGS. 1 and 2, the muffler system 20 developed for the 9 hp engine 32, due to the configuration of both the engine compartment 22 and the engine 32, had to allow the muffler system 20 to be located proximate to the crank case 58 of the engine 32. It also was required to prevent recirculation of hot air up and into the cooling blower 60 of the engine 32 and to create a cool air flow over the exhaust manifold 62 in order to prevent heat from being radiated from the exhaust manifold 62 to the carburetor 64 and to create a cool flow of air down into the top of the muffler system 20 thereby preventing the undercover or the engine compartment temperature becoming too high in those vehicles having the optional engine compartment cover 56 and simultaneously prevent the rear engine compartment shroud 50 from overheating and thus marring the vehicle's exterior finish and creating a safety hazard for the operator or anyone who might touch that area of the engine compartment shroud 50 in the area nearest the muffler system.

FIGS. 1 and 2 illustrate the specific engine compartment configuration for integrating the muffler system 20 with the 9 hp engine 32 into the available space of this particular vehicle engine compartment 22. In order to accomplish the performance requirements preferably, a series of five (5) apertures 80, 82, 84, 86, 88, three (3) apertures 80, 82, 84 on the lower portion 90 of one side 92 and two (2) apertures 86, 88 in the upper portion 96 along with the opening 98 around the entrance of the exhaust manifold 62 into the muffler 102 and the elongated opening 99 surrounding the bracket 116 connection to the muffler 102 were experimentally determined to allow the muffler system 20 to be positioned within the engine compartment 22.

Figure 3:
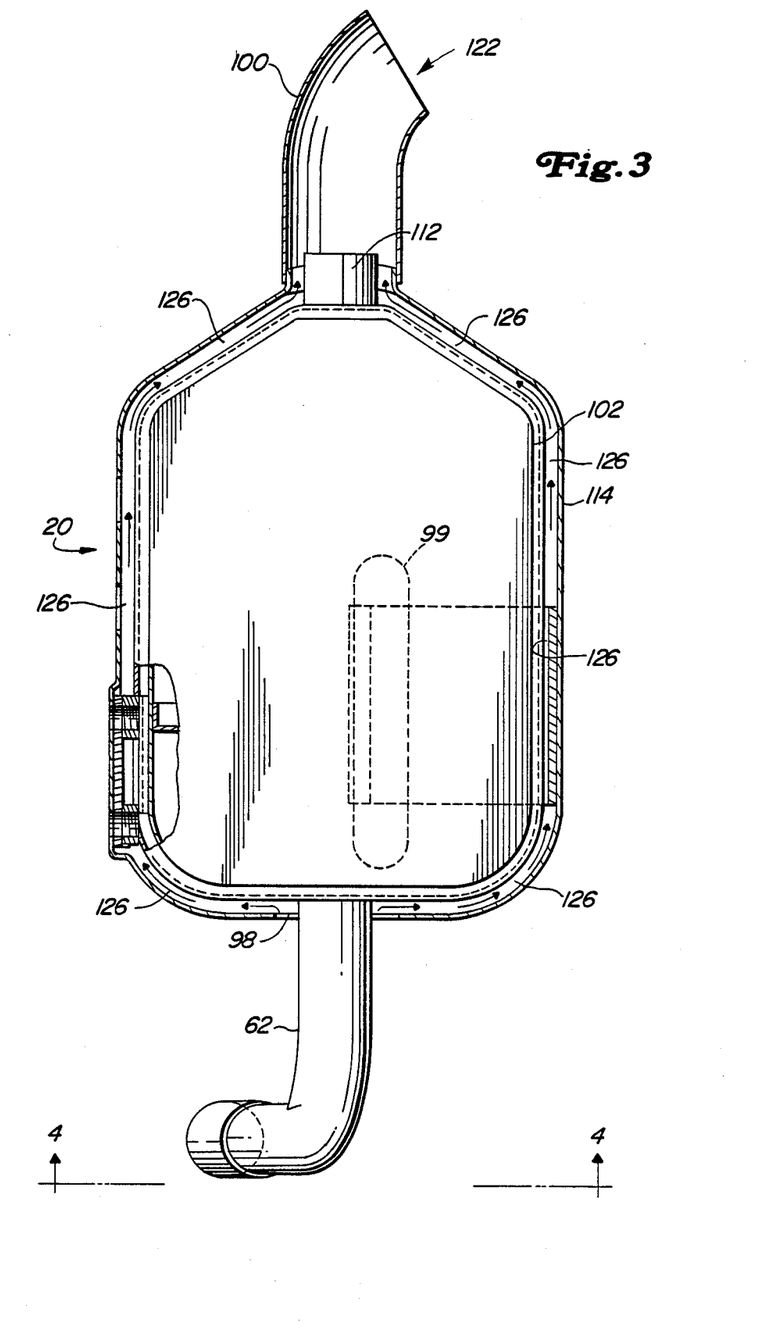
FIG. 3 is a sectional view of the muffler system of the present invention taken along line 3—3 of FIG. 2.
Figure 4:
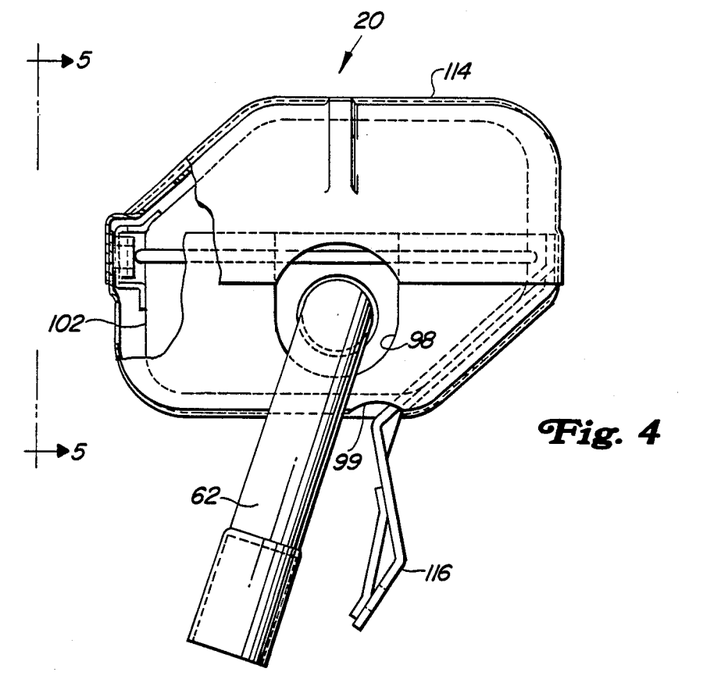
FIG. 4 is a view of the muffler system of the present invention taken along lines 4—4 of FIG. 3;.
Figure 5:
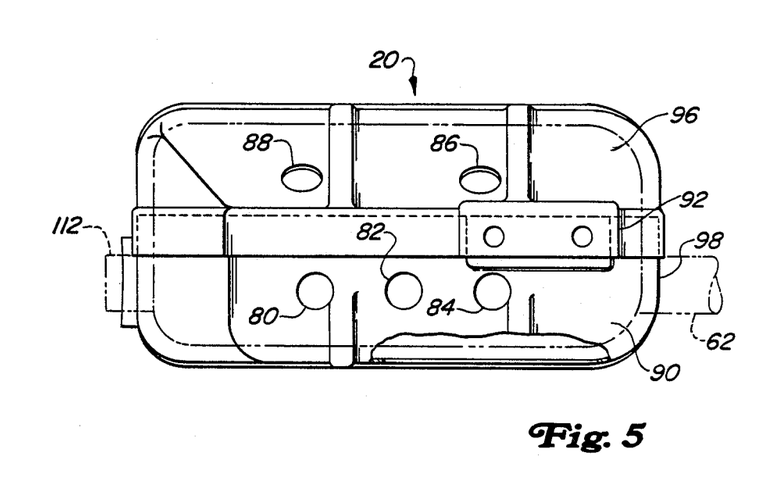
FIG. 5 is a view of the muffler system of the present invention taken along 5—5 of FIG. 4.

As shown in FIGS. 3-5, the muffler system 20 of the present invention is comprised of an exhaust manifold 62 which is connected to a muffler 102 having an exhaust portion 112. A heat shield 114 encloses the muffler 102 except for five apertures 80, 82, 84, 86, 88 and the two opening 98, 99 around the exhaust manifold 62 connection to the muffler 102 and the bracket 116 for mounting the muffler system 20 to the chassis 28. The opening 99 around the bracket 116 provides for a flow of cool air into the passageway which effectively cools the crankcase 58 by eliminating the radiation of heat from the muffler system 20 toward the crankcase 58.

As illustrated in FIG. 3, exhaust fumes enter the muffler 102 through the exhaust manifold 62 and exit the muffler 102 through the muffler exhaust member 100 112. The elongated portion surrounding heat shield 114 in combination with the muffler exhaust portion 112 forms the exhaust pipe 122.

When the engine is running and exhaust gases are, entering the muffler 102 and exiting through the exhaust portion 112, air is being pulled through the apertures 80, 82, 84, 86, 88 and the two openings 98, 99 in the heat shield 114. The location of the apertures and the openings in the heat shield 114 are selected so that cooler air is pulled into the passageway 126 between the heat shield 114 and the muffler 102 itself.

A venturi effect is created by the hot exhaust gases being directed into the heat shield elongated member 100. The cooler air is pulled into the passageway 126 through each of the apertures and openings, along the surface of the muffler 102 and between the heat shield 114 and the muffler 102 toward the exhaust pipe 122 by the pressure of the hot exhaust gas discharging from the muffler exhaust portion 112 into the elongated member 100. It is known that the pressure of the hot exhaust gases entering the elongated member 100 results in a substantial increase in velocity of the exhaust gases as they leave the exhaust pipe 122 and enter the atmosphere external the engine compartment 22.

The high velocity of the exhaust gases creates a flow of cooler air into the apertures and openings of the heat shield and along the surface of the muffler between the internal surface of the heat shield and the muffler. The muffler surface heat is not only transferred to the cooler air, but the cooler air once heated is also mixed with the hot exhaust gases exiting the muffler exhaust portion 112 into the elongated member 100 thereby cooling the actual exhaust gases which is discharged externally of the engine compartment 22.

Since the air flow within the engine compartment is toward the apertures and the openings, the external surface of the heat shield 114 containing the apertures and the openings radiates less heat than the surfaces of the heat shield not having apertures and openings. Since primary consideration for positioning the apertures and openings in the heat shield 114 is to minimize the heat radiated therefrom, the cooler air is drawn into the engine compartment over the engine and then into the apertures and openings to flow along the surfaces of the muffler 102 and is then mixed with the hot exhaust gases before being discharged into the atmosphere outside of the engine compartment 22.

Those surfaces of the heat shield 114 not having apertures or openings do not have the benefit of a constant flow of cooler air onto their outer surface and thus heat radiates from those outer surfaces and those outer surfaces not proximate critical engine components or the shroud are selectively allowed to radiate much greater heat than the heat radiated from the surfaces having the apertures and openings.

Specifically, since the flow of air is toward the apertures and openings and away from the critical engine components and the shroud, the cooler air movement minimizes heat radiation from the outer surfaces of the heat shield 114 back toward the direction of air flow. Thus, the apertures and openings must be placed on the surfaces of the heat shield which are in near proximity to the critical components mentioned above in order to provide the required cooling thereof.

Thus, the specific configuration of each muffler system and the apertures and openings required to cool each engine compartment varies with each engine configuration and each particular engine compartment and combination thereof.

A further design consideration is maximization of the venturi effect created by the discharge of the hot exhaust gases into the exhaust pipe. Thus, the particular location and sizes of the apertures and openings must be optimized by experimentation in each case in order to reduce heat radiating from the heat shield toward the critical components of the engine and engine shroud to an acceptable level and at the same time maximizing the movement of air into the apertures and openings along the muffler and out through the exhaust pipe 122.

In the case of the 12.5 hp engine 34 shown in FIG. 6, the muffler system 21 developed, due to the engine 34 configuration within the given engine compartment 22, the muffler system 21 developed was required to have an exterior surface 72 in near proximity to the both the engine compartment shroud 50 and the carburetor 64. Thus, the design of the 12.5 hp muffler system 21 required that a minimum amount of heat be directed from the muffler system toward either of these critical components in order to avoid carburetor vapor lock or marring to the shroud 50 finish and/or potential injury to the operator or anyone else touching that area of the engine compartment shroud 50. Additionally, as with the 9 hp engine 32, there was a requirement to create a cool air flow down into the top of the muffler system 21 in order to prevent the underhood temperature from becoming excessive when the engine compartment was covered with the optional engine compartment cover 56 (not shown).

Figure 7:
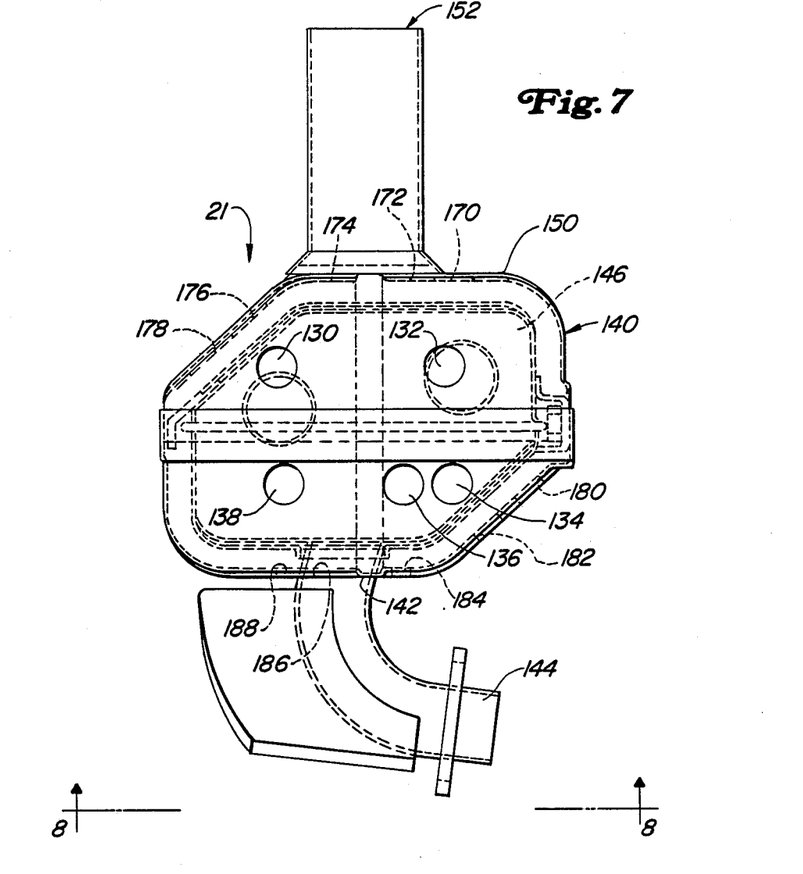
FIG. 7 is an isolated top view of the muffler system of the present invention utilized with a 12.5 hp engine.
Figure 8:
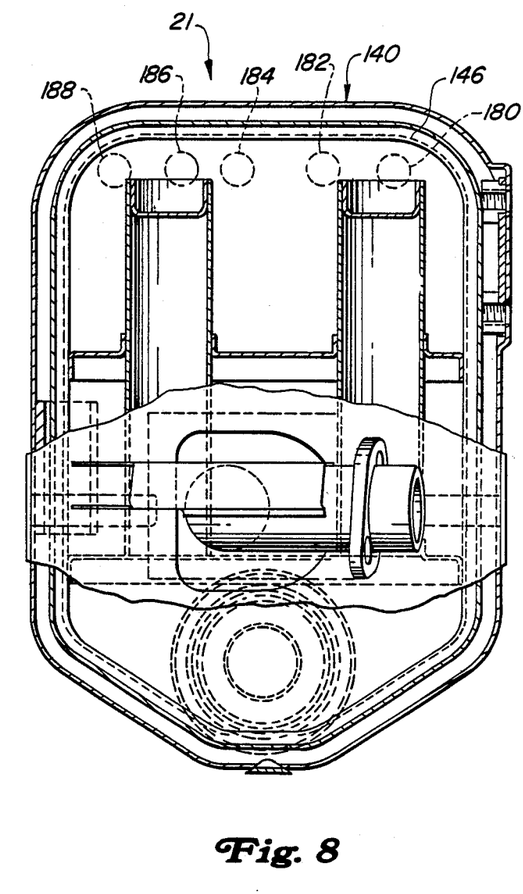
FIG. 8 is a sectional view taken along line 8—8 of FIG. 7.

As shown in FIGS. 6-8, the muffler system 21 connected to the 12.5 hp engine 34 is located in a different area of the engine compartment 22 than that for the 9 hp engine 32. Specifically, as shown in FIGS. 6 and 7, this muffler system 21 has five (5) apertures 130, 132, 134, 136, 138 located in the top 139 of the heat shield 140 and an opening 142 formed around the entrance of the exhaust manifold 62 into the muffler 146. Due to the particular configuration of the 12.5 hp engine 34, the muffler system 21 utilized therewith required that the exhaust manifold 144 be connected from the engine 34 to one side 148 of the muffler 146 and be exhausted from a second side 150, rather than enter one end of the muffler and exit the other as with the 9 hp muffler system 32 in order to fit within the given engine compartment 22. An additional five (5) apertures are preferably formed on each side 148, 150 of the heat shield 140 proximate the top 139 thereof. Apertures 170, 172, 174, 176, 178 are formed in side 150 with apertures 180, 182, 184, 186, 188 being formed in side 148.

As with the 9 hp, engine 32 there were certain components of the 12.5 hp engine 34 proximate the muffler system 21 itself which required that the apertures, preferably fifteen (15) and the opening 142 around the exhaust manifold for pulling the cool air over the engine and into the muffler system 21 between the heat shield 140 and the muffler 146 be designed to not only cool the muffler 146 and to maximize the venturi effect of the exhaust pipe 152, but also to keep heat from radiating from the outer surface of the heat shield 140 back into the engine compartment 22 toward the critical components of the engine 34 and the shroud 50. After extensive experimentation, the position and size of the fifteen (15) apertures and the opening 142 around the exhaust manifold 144 as illustrated indicates the preferred location for accomplishing the above objectives. It should be pointed out that the open surface area created by the apertures and opening in the heat shield must be selected to optimize the venturi effect.

Given the requirement of designing a muffler system 20, 21 for utilization with a particular engine compartment 22, the first consideration is to identify the particular location within the engine compartment 22 where the muffler system 20, 21 will be positioned. Once this location is determined and the basic external shape of the muffler system 20, 21 is determined, the muffler system itself is desinged to fit within that particular area. Next, the surfaces of the muffler heat shield which are in near proximity to critical components of either the engine or the engine compartment are identified. Apertures and openings as necessary are formed in the heat shield which provide for the movement of cooling air through the apertures and openings into the passageway between the heat shield and the muffler along the muffler surface and into the exhaust pipe. The total area of the apertures and openings are determined experimentally so that the heat radiated from the muffler system toward the critical components does not exceed an acceptable level while maximizing the venturi effect achieved by the discharge of the exhaust gases from the muffler into the exhaust pipe. These determinations are made when the engine compartment is enclosed from both the top, front, rear, left and right with the only open portion being the bottom.

While the process and product herein described constitutes the preferred embodiments of the invention, it is to be understood that the invention is not limited to this precise process and product, and that changes may be made therein without departing from the scope of the invention which is defined in the appended claims.

What is claimed is:

1. A muffler system at least partially mounted within an engine compartment of a vehicle having an engine mounted therein, said muffler system comprising:
   manifold means operatively connected to said engine, for transporting exhaust gases from said engine;

muffler means having an inlet and an outlet, operatively connected to said manifold means, for attenuating the engine noise carried by said exhaust gases;

shield means, operatively connected to and at least partially enclosing said muffler means such that a space is defined therebetween, for selectively reducing the heat radiated from said muffler means;

exhaust gas discharging means, operatively connected to said shield means, for receiving exhaust gases from said muffler means outlet;

aperture means, selectively operatively formed in said shield means adjacent selective areas in said engine compartment, for selectively allowing cooler air into said space between said shield means and said muffler means thereby selectively directing heat radiated from said muffler means away from said selected areas of said engine compartment such that selected areas of said shield means radiate relatively less heat than other areas of said shield means; and venturi effect means formed by positioning said muffler means outlet relative to said discharging means such that said cooler air is pulled into said space defined between said shield means and said muffler means through said aperture means thereby mixing said cooler air with said exhaust gases prior to said mixture being discharged through said discharging means outside said engine compartment.

2. The muffler system of claim 1 wherein said manifold means comprises an exhaust manifold.

3. The muffler system of claim 1 wherein said aperture means further comprises:

at least two apertures selectively located in said shield means such that heat radiated from said muffler means is directed away from said selected areas of said engine compartment.

4. The muffler system of claim 1 wherein said aperture means further comprises:

at least five apertures and one opening selectively positioned in said shield means such that heat radiated from said muffler means is directed away from selected areas of said engine compartment.

5. The muffler system of claim 3 wherein said aperture means further comprises:

at least 5 apertures operatively formed in said heat shield on one side of said heat shield and at least one opening operatively formed in said heat shield at the connection point of said exhaust manifold with said muffler means such that heat radiated from said heat shield toward selected areas of said engine compartment is significantly reduced.

6. A muffler system for a vehicle having an engine mounted inside an engine compartment, said muffler system comprising:

an exhaust manifold, operatively connected to said engine, for transporting exhaust gases from said engine;

a muffler, operatively connected to said exhaust manifold, for attenuating the engine noise of said exhaust gases and having an inlet connected to said exhaust manifold and an outlet for discharging said exhaust gases;

a heat shield, operatively connected to and at least partially surrounding said muffler, for reducing the heat radiated from said muffler, said heat shield having aperture means formed therein at selected locations for allowing cooler air into a space defined between said muffler and said heat shield through said aperture means thereby selectively directing the heat radiated from said muffler away from selected areas of said engine compartment; and discharging means, operatively connected to said heat shield for discharging said exhaust gases outside said engine compartment, said muffler outlet being positioned in said discharging means such that a venturi effect is created thereby for pulling said cooler air into said space between said muffler and said heat shield through said aperture means such that said cooling air and said exhaust gases are mixed together prior to being discharged outside said engine compartment.

7. The muffler system of claim 6 wherein said aperture means further comprises:

at least five apertures selectively positioned in at least one side of said heat shield;

at least one opening selectively positioned in said heat shield where said exhaust manifold connects with said muffler whereby said apertures and said opening combine to allow cooler air from outside said engine compartment to be drawn over said engine through said apertures into said space defined therebetween to selectively direct heat away from selected areas of said engine compartment.

8. The muffler system of claim 7 wherein said aperture means further comprises:

at least an additional ten (10) apertures operatively formed in said heat shield for selectively directing heat away from said selected areas of said engine compartment and for maximizing said venturi effect means.

9. The muffler system of claim 6 wherein said heat shield has at least sufficient apertures formed therein for pulling at least sufficient cooler air from outside said engine compartment over said engine and into said apertures for at least sufficiently cooling said selected areas of said engine compartment.

10. The muffler system of claim 9 wherein said sufficient apertures are operative to maximize said venturi effect means while providing at least sufficient cooling air to selectively cool said selected areas of said engine compartment.

11. A method for selectively cooling a muffler system for utilization with a particular engine for mounting in a selected engine compartment, said method comprising the steps of:

determining the space available in said engine compartment for mounting said muffler system therein;

assembling a muffler system composed of at least a muffler and a heat shield, said heat shield at least partially surrounding said muffler and defining a space therebetween, into said available engine compartment;

selectively determining the optimum location of aperture means in said heat shield for allowing air into said space defined between said muffler and said heat shield for drawing cooler air into said space such that less heat is radiated from selected locations on said heat shield into said selected areas of said engine compartment proximate said aperture means.

12. The method of claim 1 wherein said method further comprises the step of:

determining the optimum location of said aperture means in said heat shield such that a venturi effect means is optimized.

13. A muffler system for a vehicle having an engine mounted in an engine compartment, said muffler system comprising:
- an exhaust manifold, operatively connected to said engine, for transporting exhaust gases from said engine;
- a muffler having an inlet and an outlet, operatively connected to said exhaust manifold, for attenuating the engine noise carried by said exhaust gases;
- a heat shield, operatively connected to and at least partially surrounding said muffler thereby defining a space between said heat shield and said muffler, for selectively reducing the heat radiated from said muffler;
- a member, operatively connected to said heat shield, for receiving said exhaust gases from said muffler outlet;
- aperture means, selectively formed in said heat shield adjacent selected areas of said engine, for allowing cooler air into said space defined between said muffler and said heat shield; and
- venturi effect means formed by selective positioning of said muffler outlet in said member such that said cooler air is pulled into said space defined between said heat shield and said muffler through said aperture means, thereby selectively reducing the heat radiated from said muffler toward said selected areas of said engine compartment, said venturi effect means mixing said cooler air and said exhaust gases prior to said mixture being discharged through said member outside said engine compartment.

* * * * *

UNITED STATES PATENT AND TRADEMARK OFFICE
CERTIFICATE OF CORRECTION

PATENT NO. : 4,741,411

DATED : 3 May 1988

INVENTOR(S) : David K. Stricker

It is certified that error appears in the above-identified patent and that said Letters Patent is hereby corrected as shown below:

Column 8, line 67, delete "1" and insert -- 11 -- .

Signed and Sealed this

Fifteenth Day of August, 1989

Attest:

DONALD J. QUIGG

Attesting Officer

Commissioner of Patents and Trademarks